United States Patent [19]

Sheridon

[11] Patent Number: 5,344,594
[45] Date of Patent: Sep. 6, 1994

[54] METHOD FOR THE FABRICATION OF MULTICOLORED BALLS FOR A TWISTING BALL DISPLAY

[75] Inventor: Nicholas K. Sheridon, Los Altos, Calif.

[73] Assignee: Xerox Corporation, Stamford, Conn.

[21] Appl. No.: 989,400

[22] Filed: Dec. 11, 1992

Related U.S. Application Data

[63] Continuation-in-part of Ser. No. 784,294, Oct. 29, 1991, abandoned.

[51] Int. Cl.$^5$ .................. B01J 13/18; B01J 13/20; G02F 1/15
[52] U.S. Cl. ................. 264/4.1; 252/583; 252/586; 264/4; 264/4.3; 264/4.33; 264/4.7; 359/265; 359/273; 430/37; 522/71; 522/170
[58] Field of Search ............... 252/583, 586; 264/4.3, 264/4.33, 4.7, 4; 106/23; 425/5, 804; 430/37; 503/204; 522/71, 170; 359/265, 273

[56] References Cited

U.S. PATENT DOCUMENTS

| | | | |
|---|---|---|---|
| 2,932,061 | 4/1960 | Jansen | 264/4 |
| 3,423,489 | 1/1969 | Arens et al. | 264/4 |
| 3,464,926 | 9/1969 | Vandegaer et al. | 264/4.7 |
| 3,738,857 | 6/1973 | Brockett et al. | 428/402.2 X |
| 3,767,392 | 10/1973 | Ota | 430/37 X |
| 3,794,576 | 2/1974 | Watt | 522/170 X |
| 4,126,854 | 11/1978 | Sheridon | 340/373 |
| 4,143,103 | 3/1979 | Sheridon | 264/4 |
| 4,211,668 | 7/1980 | Tate | 264/4.3 |
| 4,454,083 | 6/1984 | Brown et al. | 264/4.7 |
| 4,626,471 | 12/1986 | Chao | 428/402.21 |
| 4,810,431 | 3/1989 | Leidner | 264/15 |
| 4,902,450 | 2/1990 | Morrison | 264/4 |
| 5,126,381 | 6/1992 | Liscomb | 264/4.3 X |
| 5,209,978 | 5/1993 | Kosaka et al. | 264/4.3 X |

FOREIGN PATENT DOCUMENTS

| | | | |
|---|---|---|---|
| 2166570 | 5/1972 | Australia. | |
| 0046535 | 3/1982 | European Pat. Off. | C08F 2/00 |
| 0427507 | 5/1991 | European Pat. Off. | G09F 9/37 |
| 1296788 | 5/1962 | France. | |
| 1378330 | 10/1964 | France. | |
| 2128749 | 10/1972 | France. | |
| 8003919 | 7/1980 | Netherlands | B29B 1/02 |
| 563807 | 7/1975 | Switzerland | B29C 67/00 |

*Primary Examiner*—Richard D. Lovering

[57] ABSTRACT

A method of forming hemispheric bichromal balls, including the steps bringing together two streams of differently colored hardenable liquids for forming a single side-by-side bichromal stream, expelling said single side-by-side bichromal stream into a fluid as one or more free jets whose forward ends becomes unstable and break up into droplets which form into spherical balls, each of the balls comprising hemispheres of differently colored hardenable liquid, and finally hardening the balls.

7 Claims, 7 Drawing Sheets

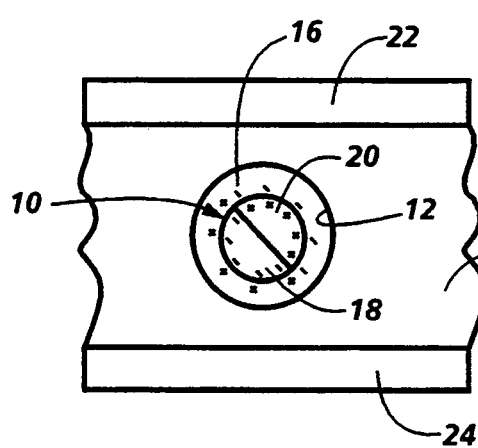
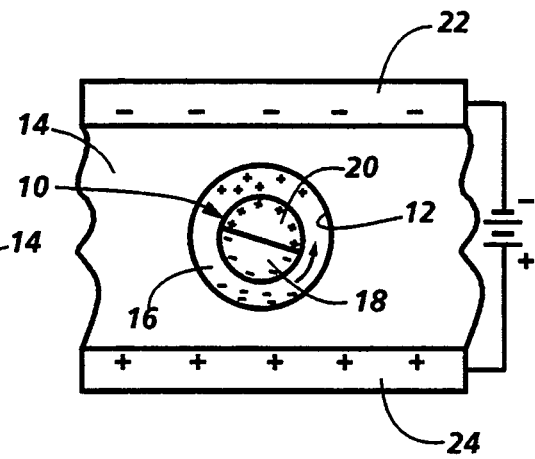
Fig. 1a  Fig. 1b
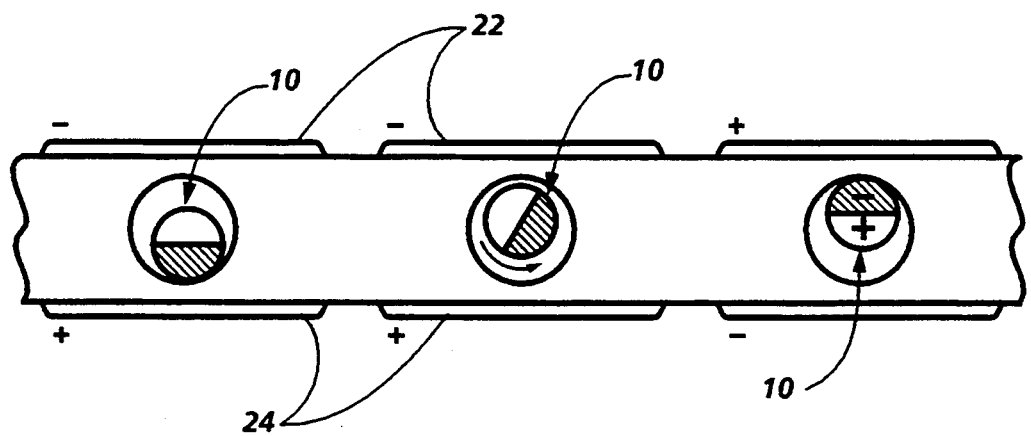
Fig. 2

METHOD FOR THE FABRICATION OF MULTICOLORED BALLS FOR A TWISTING BALL DISPLAY

This application is a continuation-in-part of U.S. Ser. No. 07/784.294 filed on Oct. 29, 1991 (now abandoned).

FIELD OF THE INVENTION

This invention relates to the fabrication of small balls, about 5 to 200 microns in diameter, having side-by-side portions of different colors and, more particularly, the formation of balls having hemispheres of contrasting colors for use in an "electric paper" display sheet.

BACKGROUND OF THE INVENTION

A display sheet and display system is disclosed in a copending patent application, assigned to the same assignee as this application, U.S. Ser. No. 07/433,311 filed Nov. 8, 1989 and now abandoned, entitled "Paper-Like Computer Output Display and Scanning System Therefor" which is fully incorporated herein by reference. Also incorporated herein by reference are U.S. Pat. Nos. 4,126,854 and 4,143,103 and an article entitled "The Gyricon—A Twisting Ball Display", published in the Proceedings of the S.I.D., Vol. 18/3&4, Third and Fourth Quarters 1977.

The display device, in sheet form, as described in my copending application comprises a thin transparent sheet having many of the attributes of paper documents. It looks like paper, has ambient light valve behavior like paper (i.e. the brighter the ambient light, the more easily it may be seen), flexible like paper, can be carried around like paper, can be written on like paper, can be copied like paper, and has nearly the archival memory paper. It is also possible to form the display device as a rigid structure incorporating an array of addressing electrodes. In both embodiments, the salient features are an elastomeric host layer a few mils thick which heavily loaded with balls tens of microns in diameter. Each bichromal bail has hemispheres of contrasting colors, such as a white half and a black half, and is contained in its own spherical cavity filled with a dielectric liquid. Upon application of an electrical field between electrodes located on opposite surfaces of the host layer, the balls will rotate depending on the polarity the field, presenting one or the other hemisphere to an observer.

In the above-identified article, there is disclosed a method for fabricating bichromal balls. First, monochromatic glass balls are formed, heavily loaded with titanium dioxide so as to appear white. These are deposited in a monolayer upon a substrate. Then the balls are coated from one direction in a vacuum evaporation chamber with a dense layer of nonconductive black material which coats one hemisphere.

As illustrated in FIG. 1a bichromal balls 10 are loaded in liquid filled cavities 12 in a host matrix 14. Both the liquid 16 surrounding the balls and the balls themselves are dielectric. Therefore, although the balls are macroscopically electrically neutral, on a microscopic scale they have an electrical double layer comprising two layers of charges of opposite sign (as shown). One charge layer is localized at the surface of the ball and the other charge layer is in the nature of a space charge extending outward from the surface of the ball into the dielectric liquid. The measurable aspect of the electrical double layer, known as the zeta potential, is the net surface and volume charge that lies within a shear surface associated with the motion the ball through the liquid. For a given liquid, the zeta potential is a function only of the ball surface material. Thus, the material properties which give rise to differences associated with the color or reflectivity of each hemisphere 18 and 20 give rise to different characteristic zeta potentials with respect to the dielectric liquid 16 in the cavity 12. It is the difference in zeta potential between the hemispheres of the ball which causes the ball to act like a dipole in the presence of an electrical field, as illustrated in FIG. 1b. The ball 10 will rotate, until its dipole moment lines up with the direction of the electrical field established between opposed electrodes 22 and 24.

In addition to the dipole charge distribution found on the bichromal ball the presence of an electrical field. there is also a monopole charge which the net electrical charge. It is quite unlikely that the two hemispheres and 20 having zeta potentials of opposite polarity will have the same magnitude. However, if that is the case, a monopole charge will not be established. As a result of the monopole charge, the ball 10 is caused to translate in the direction of the electrical field and will rest and be retained against the cavity wall, as illustrated in FIG. 2. In order for the ball rotate easily in the liquid within the cavity, due to the dipole charge, it must move from contact with the cavity wall. When at rest against the cavity wall, friction and other forces will prevent it from rotating until it has been moved away once again, due to the monopole charge. It is this feature which enables long term image retention in this display device.

In my copending patent application, identified above, of which this application is a continuation-in-part, there is disclosed the flowing together of two side-by-side streams of differently colored hardenable liquids into the center of a laminarly flowing host liquid. The forward end of the thus introduced bichromal stream becomes unstable and breaks up into droplets which form into spherical balls as they are moved by the host liquid Further transport of the balls by the host liquid moves them past a curing station and a separating station.

It is an object of the present invention to generalize the invention of the copending parent application to include expelling the side-by-side multichromal stream, into a fluid as one or more free jets, i.e. one not constrained by any solid surface.

SUMMARY OF THE INVENTION

The present invention may be carried out, in one form, by providing a method of forming hemispheric bichromal balls, including the steps bringing together two streams of differently colored hardenable liquids for forming a single side-by-side bichromal stream, expelling the single side-by-side bichromal stream into a fluid as one or more free jets whose forward ends becomes unstable and break up into droplets which form into spherical balls, each of the balls comprising hemispheres of differently colored hardenable liquid, and finally hardening the balls.

BRIEF DESCRIPTION OF THE DRAWINGS

Other objects and further features and advantages of this invention will apparent from the following, more particular, description considered together with the accompanying drawings, wherein:

FIG. 1a is schematic representation of an electrical double layer associated with each ball hemisphere within a dielectric liquid filled cavity, before the application of an electrical field, FIG. 1b is schematic representation of an electrical double layer associated with each ball hemisphere within a dielectric liquid filled cavity after the application of an electrical field causes the ball to rotate.

FIG. 2 is schematic representation of rotation and translation of the bichromal ball within its cavity.

DESCRIPTION OF THE ILLUSTRATED EMBODIMENTS

Figure 3:
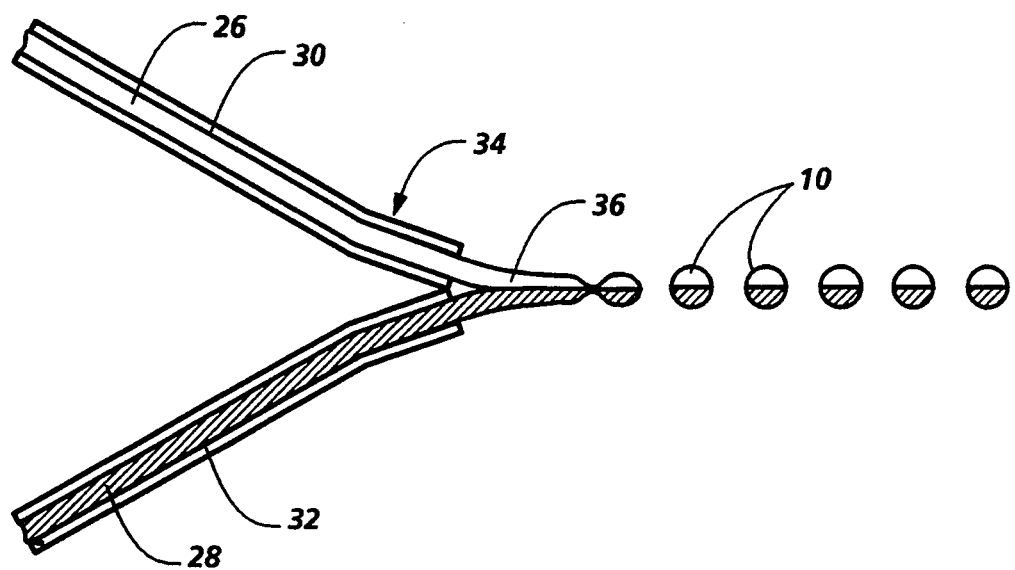
FIG. 3 is a schematic view of the two differently colored streams of hardenable liquid being brought together to form a free jet in the form of a bichromal stream which breaks up into bichromal balls.

Turning to FIG. 3 there is illustrated a generalized form of the present invention for making small, pigmented (or dyed) balls 10 that have side-by-side portions 18 and 20 of two different colors. Two fine streams 26 and 28 of a hardenable liquid material are pumped through tubing 30 and 32 whose ends are bent to form a double nozzle 34. As the materials exit the nozzle they flow toward one another and establish a single side-by-side stream which forms as a free jet 36. A free jet is defined as a jet of fluid flowing through a fluid, either a liquid or a gas, and unconstrained by being in contact with a solid surface. The leading edge of the free jet becomes unstable (as shown) due to its velocity or other imposed condition, such as vibration of the nozzle, and will shortly break up into a train of droplets which will form into spheres 10 under the influence of surface tension. The spheres will be bichromally hemispherically layered and of a generally uniform diameter, approximately twice the diameter of the free let 36. The spheres should be hardened as they are transported through the fluid before encountering a solid surface which would cause them to deform. This contemplates jetting the hardenable liquid materials into the air, as shown in FIGS. 3 to 6, or into a host liquid, as shown in FIGS. 7 to 12.

Figure 4:
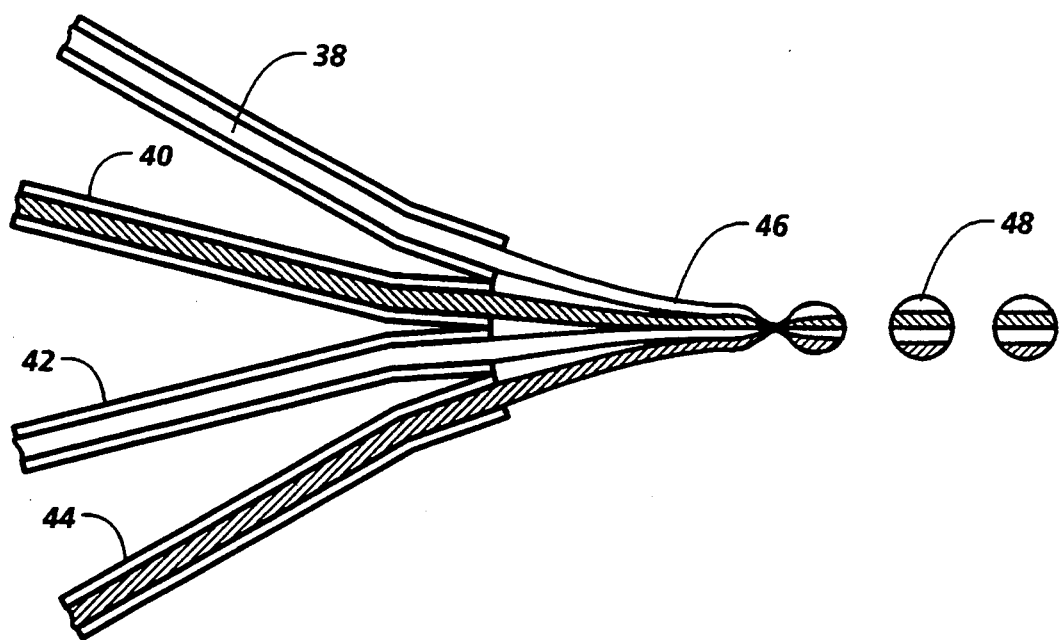
FIG. 4 is a schematic view of four streams converging to form a side-by-side free jet in the form of a multichromal stream which breaks up into side-by-side multichromal balls.

The present method also will allow the fabrication of striated balls which may be made by flowing together, in a side-by-side manner, any number of streams of hardenable liquid. As illustrated in FIG. 4, four streams 38, 40, 42 and 44 are flowed together through a quadruple nozzle to establish a single side-by-side free jet 46 whose leading end breaks up into droplets which form striated, layered spheres 48 having parallel multicolored segments.

Figure 5:
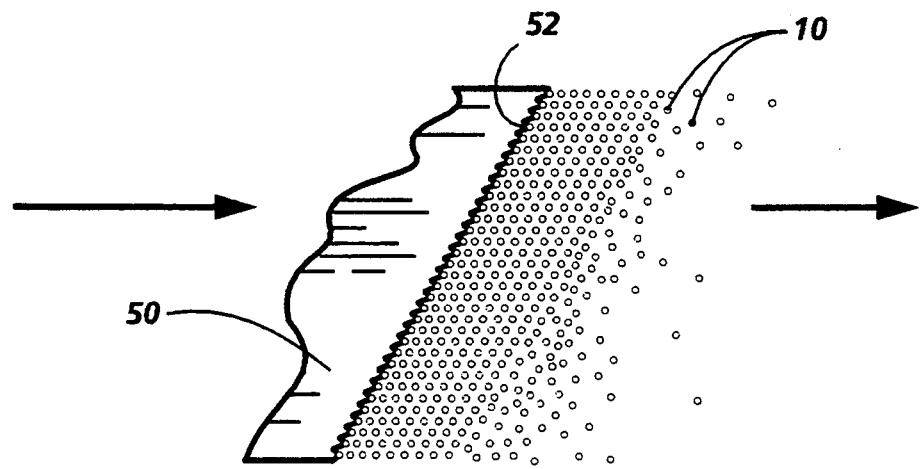
FIG. 5 illustrates a plurality of free jets emanating from the forward end of a bichromal planar sheet.

In order to increase the output of bichromal balls, as would be needed to fabricate typical 8×10 inch sheets of display material in commercially feasible quantities, a multiplicity of one dimensional, rod-like, free jets 36 is required. Alternatively, a much larger number of balls can be made from a two dimensional bichromal planar liquid sheet 50, as illustrated in FIG. 5. Two planar sheets of hardenable liquid material, each of a different color, are brought together in a side-by-side manner so as to establish a single planar sheet whose leading edge 52 is highly unstable so that its forward edge breaks up into plural free jets, from each of which droplets form into bichromal spheres 10.

Figure 6:
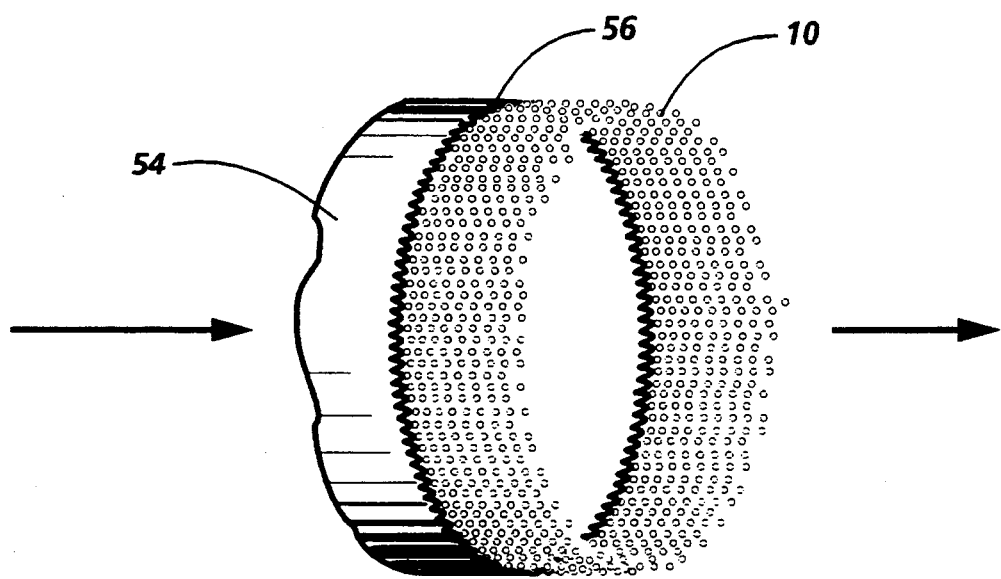
FIG. 6 illustrates a free jets emanating from the forward end of a bichromal cylindrical sheet.

A three dimensional configuration of the bichromal sheet stream, as illustrated in FIG. 6, represents another high capacity ball fabrication technique. The leading edge 56 of the cylindrical liquid sheet 54 also delivers bichromal balls 10 in accordance with this invention. Planar sheet streams 50 have a strong tendency to contract at the lateral free edges, toward the center of the sheet, due to surface tension effects. This contraction causes a thickening of the stream at the sides which, upon breakup into free jets and droplets, results in larger ball diameters at the sides of the sheet than at its center. Since it is most desirable for the resultant balls to have uniform diameters, the cylindrical stream 54, which has no lateral free surfaces and will contract uniformly, is superior to the planar sheet stream 50.

The free jets in each of the above described one, two and three dimensional embodiments may be projected into any suitable fluid. A suitable gaseous fluid, such as air, is compatible with rapidly hardenable materials, while a suitable host liquid, such as Fluorinert FC-70 ®, made by the 3M Company of St. Paul, Minn. is compatible with slowly hardenable epoxy materials.

Figure 7:
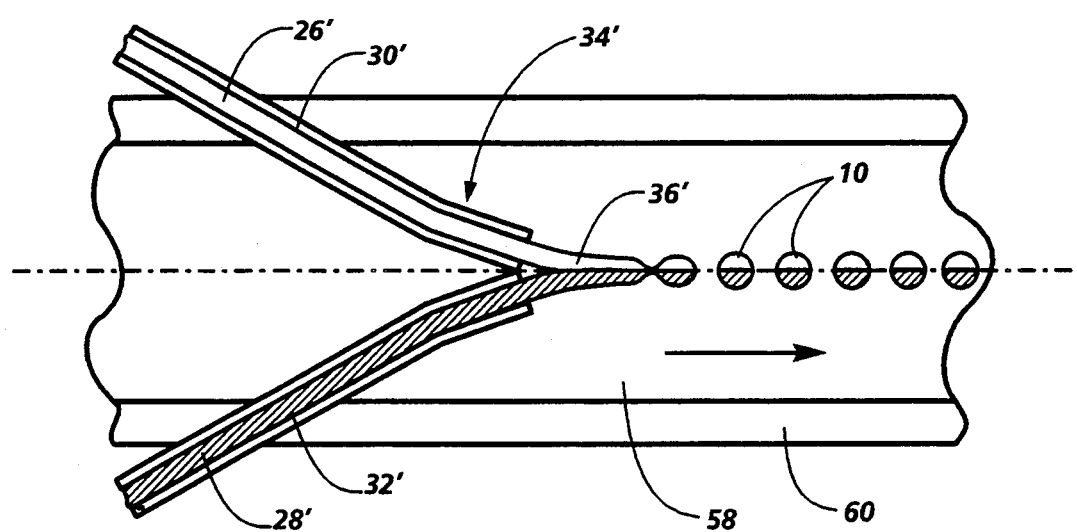
FIG. 7 is a schematic view of two differently colored streams of hardenable liquid being brought together to form a bichromal stream in a moving host liquid, which stream breaks up into bichromal balls.

In a test set-up, schematically illustrated in FIG. 7, two fine streams 26' and 28' of a hardenable liquid material are pumped through tubing 30' and 32' whose ends are bent to form a double nozzle 34'. The hardenable liquid of the fine streams 26 and 28 was a clear two-component epoxy, EPO-TEK ® 301-2, made by Epoxy Technology Inc. of Billerica, Mass., which included 35% (by weight) of a curing agent. An additional 12% (by weight) of an accelerating curing agent, namely, RF91 ® made by Resin Formulators Co. of Culver City, Calif. was added for enhancing its rapid curing. One of the fine streams was pigmented white with the addition of titanium dioxide to the epoxy, at about 80% of the epoxy resin by weight. The other stream was pigmented black with the addition of carbon black to the epoxy, at about 10% of the epoxy resin by weight. The fine tubes 30' and 32' were constructed of #27 stainless steel tubing having an inner diameter of 0.008 inches and an outer diameter of 0.016 inches, converging adjacent the center of channel 60 having an inner diameter of 0.075 inches. The host liquid flowing through the channel 60 was Fluorinert FC-70 ®, made by the 3M Company of St. Paul, Minn. It was maintained at room temperature, had a kinematic viscosity of 13.4, a density of 1.94 grams/cc, and was pumped at a velocity of 25 cm/sec.

As the hardenable liquid emerges from the double nozzle 34', it quickly acquires the circular cross section of the single combined jet 36', half one color and half the other. Because the leading end of this free jet is highly unstable as it flows within the stream 58 of host liquid, its leading end will shortly break up into a train of droplets of uniformly sized bichromal spheres 10, whose diameters are equal to approximately twice the diameter of the stream 36'. By careful fabrication, the inner diameter of the channel is made smoothe so that laminar flow of the host liquid is maintained. When in laminar flow, the host liquid will entrain the free jet and the train of bichromal spheres substantially at its center. It is well known that liquid undergoing laminar flow in a tubular channel moves fastest in the center of the channel. The balls will tend to stay in the fastest moving portion of the stream because as they drift radially outwardly into a slower region, that part of the ball in the slower region will experience a higher pressure than that part of the ball in the faster region and the ball will be moved laterally and returned to the center of the channel. By maintaining the proper liquid velocity the balls will remain in the center of the channel, even through very small radius bends.

Figure 8:
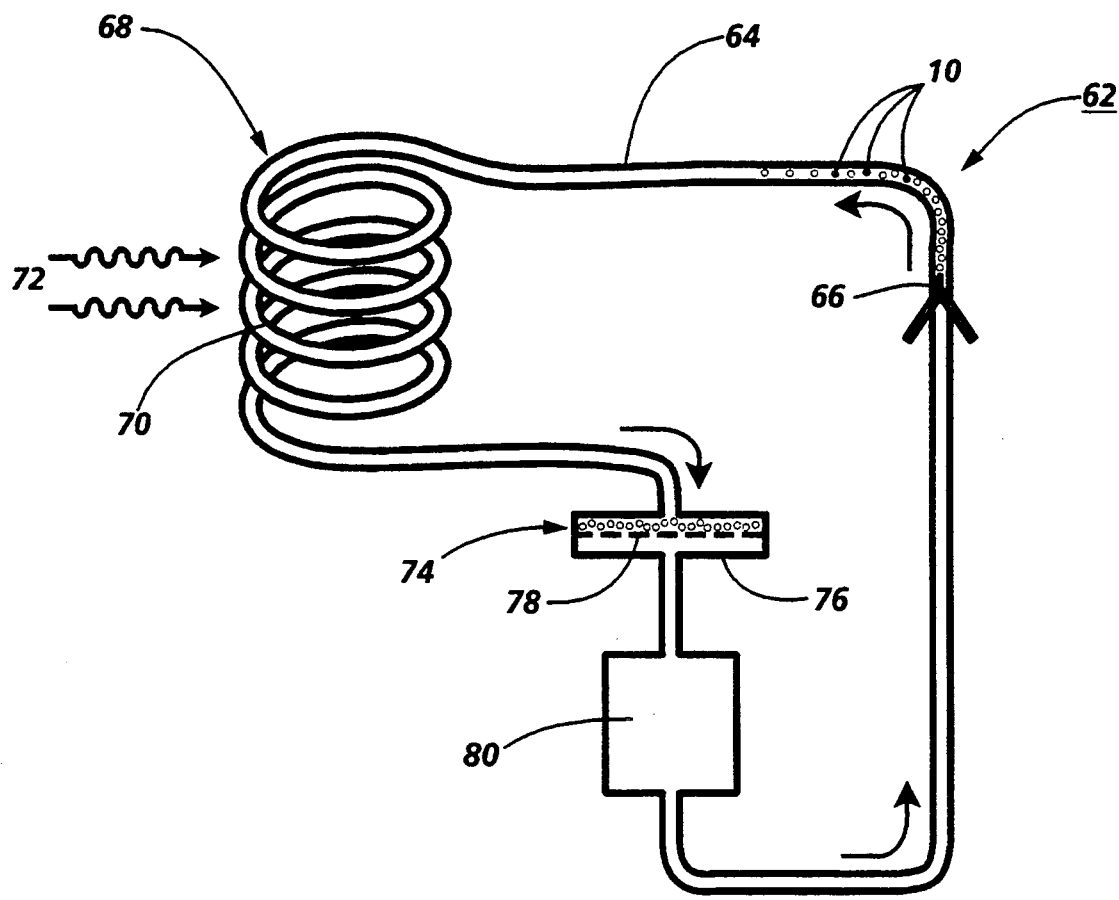
FIG. 8 is a schematic view of a recirculating liquid apparatus for continuous fabrication of bichromal balls.

The schematically represented embodiment of FIG. 8 relies upon this phenomenon. The balls 10 are formed in a generation region 62 and are transported for further processing within a single elongated tube 64, having an inner diameter of about 0.075 inches, which may be bent to follow the most desirable processing paths. As in the previously described embodiment, the bichromal balls are generated from a jet 66 formed by the intersection of two fine streams of hardenable liquid introduced to the center of the flowing host liquid. The host liquid moves the central stream of balls to a curing region 68 where the tubing 64 may be in the form of a coil 70, acted upon by a source of energy, indicated by arrows 72 directed at the tubing.

The coiled tubing 70 may be heated by, for example, being immersed in a thermal bath at about 180° C. Alternatively, the hardenable liquid may be of the class of light cured materials which may be cured by means of an ultraviolet light source. In such a case, the tubing would be made of quartz or other material that is transparent to ultraviolet light. Application of a high frequency alternating field (on the order of 13 MHz) to the dielectric hardenable liquid will heat it by molecular friction. Yet another radiation source for curing the hardenable liquid could be microwave electromagnetic radiation. With the addition of carbon, iron or ferrite particles (or other material absorbent of microwave radiation) to the hardenable liquid epoxy or to the pigments dispersed therein, the curing radiation could be administered via a microwave source. It would also be possible to add a curing agent to the host liquid, such that in traveling through the coiled section sufficient curing agent would diffuse into the balls to cure them.

Subsequent to curing, the balls continue through the tube into an extraction region 74 which may comprise a chamber 76 containing a screen 78, or other filtration member, that would remove the balls from the host liquid. The liquid, depleted of balls, would then be recirculated by a pump 80 and once again pass to the generation region. This is a very effective and inexpensive continuous process. Periodically, the chamber 76 would be opened and the balls removed for being deposited into the display matrix.

In general, for consistently generating spherical balls, parabolic (laminar) flow of the host liquid should be maintained in the ball transport section of elongated tubing 64. It is believed that toroidal or turbulent flow should be avoided. To this end, it has been found that the following considerations apply:

A. The tubing should be designed to be smooth and continuous. Of particular concern are the joints where two lengths of tubing are abutted. At these locations the inner diameters must be the same so that the internal walls run smoothly together. Care should be taken to minimize gaps at these joints.

B. Bends in the tubing should be smooth and not sharp.

C. If it is necessary to decrease the tube diameter, this must be accomplished by means of a smooth tapering of the tube walls over a distance large as compared to the smallest internal tube diameter.

D. Increases in tube diameter should be avoided if at all possible. However, small increases may be acceptable if the change is by means of a taper that is very long with respect to the internal diameter of the larger section.

E. Pumping should be smooth and steady.

Figure 9:
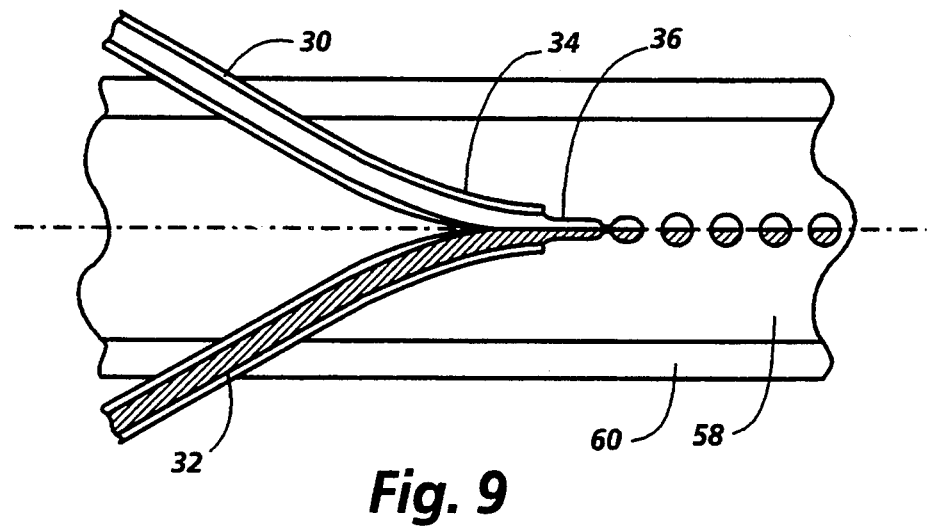
FIG. 9 illustrates one form of the double nozzle structure.
Figure 10:
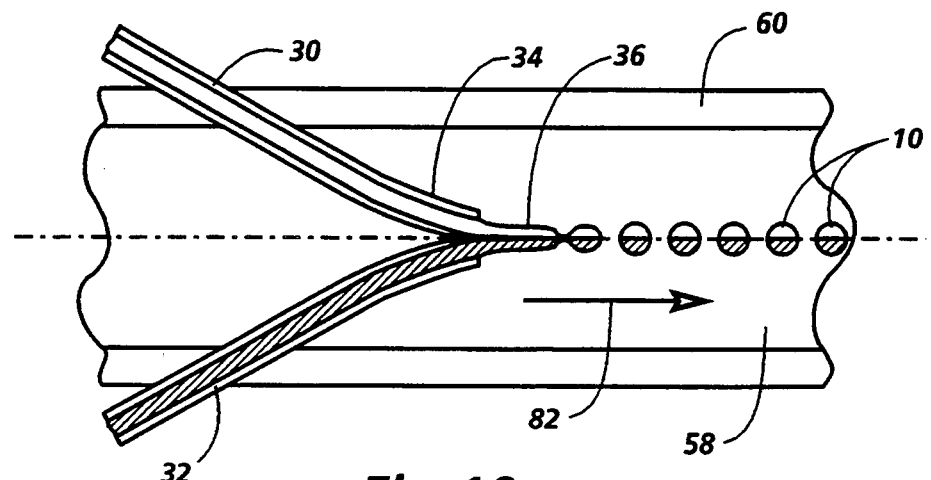
FIG. 10 illustrates another form of the double nozzle structure.

Two embodiments of the preferred form of the double nozzle structure are illustrated in FIGS. 9 and 10. In each, the adjacent wall of each tube 30 and 32 is thinned and soldered together so as to allow the streams of hardenable liquid to smoothly flow together into a rod-like bichromal stream. In FIG. 9 the streams combine before exiting the double nozzle 34, while in FIG. 10 the streams combine immediately after exiting the double nozzle.

Figure 11:
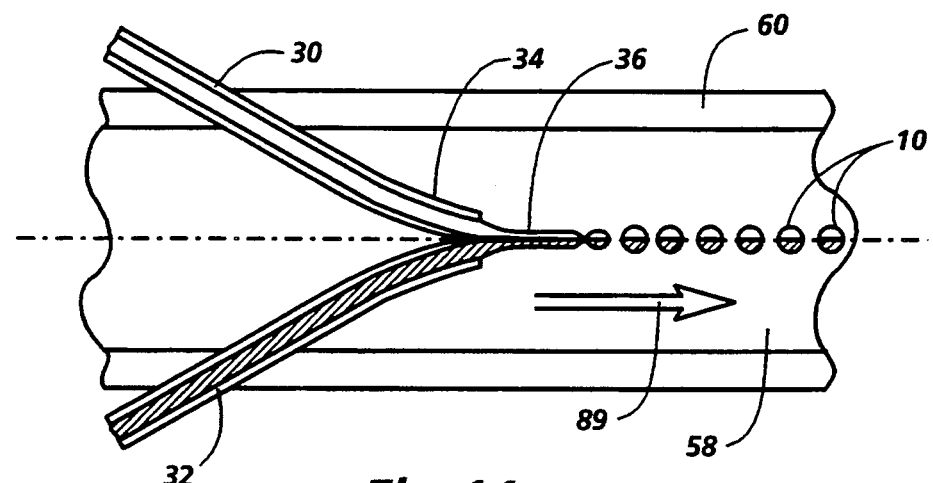
FIG. 11 illustrates the effect of rapidly moving host liquid on ball size.

As the single combined bichromal stream 36 enters the faster flowing host liquid it will smoothly neck down to a circular cross-section from which balls will be formed. At a host liquid velocity $V_1$, indicated by arrow 82, the free jet will neck down as shown. By flowing the host liquid at a much faster velocity, as indicated in FIG. 11 by the larger arrow 84, the free jet will necked down further, making it possible to control ball size. In this way very small balls may be made with nozzle structures large enough to be easily fabricated. The following relationship applies: $V_1R_1^2 = V_2R_2^2$, where $V_1R_1$ are the velocity and radius of the single bichromal jet 36 emerging from the double nozzle 34, and $V_2R_2$ are the velocity and radius of the single bichromal jet 36 moving with the velocity $V_2$ of the host liquid.

Figure 12:
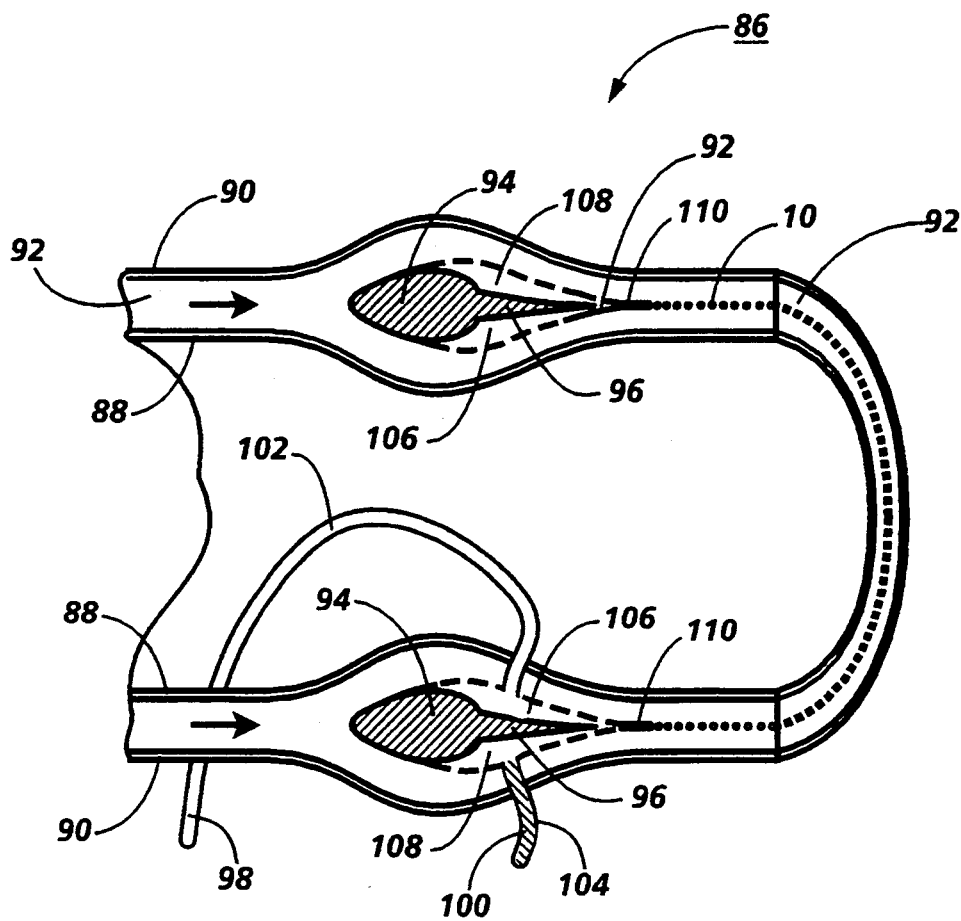
FIG. 12 is a schematic view of two differently colored streams of hardenable liquid being brought together in a cylindrical sheet jet generator to form a bichromal cylindrical stream in a moving host liquid.

In FIG. 12 there is illustrated a cylindrical sheet jet generator 86. It should be understood that curing, cooling and separating elements will be required in order to complete the fabrication apparatus. Generator 86 comprises an inner cylindrical member 88 and a concentric outer cylindrical member 90 defining an annular channel 92 through which the host liquid flows. The stream of host liquid is smoothly diverted into two cylindrical streams by an annular mandrel 94, within channel 92, and the two streams rejoin beyond the downstream tapered end 96 of the mandrel. Fine tubing 98 and 100 introduce different colored streams 102 and 104 of hardenable liquid into cavities 106 and 108 between the liquid streams and the tapered end 96 of the mandrel. The colored streams are emitted into the host liquid stream and form a bichromal cylindrical sheet jet 54 (see FIG. 6) whose forward edge 110 breaks up into bichromal balls 10. Contraction of the bichromal cylindrical sheet jet is essentially eliminated by the host liquid trapped between it and the inner cylindrical member 88. The balls will be carried along the annular channel 92 and will be centered therein.

A practical cylindrical sheet jet generator 86 could have a sheet jet diameter of 10 inches and produce 1 mil diameter bichromal balls. A device of such construction could yield a ball generation rate of approximately 60 billion balls per hour which would be sufficient to fabricate about 200 display sheets per hour, each measuring 8×10 inch, It should be understood that numerous changes in details of construction and the combination and arrangement of elements and materials may be resorted to without departing from the true spirit and scope of the invention as hereinafter claimed.

What is claimed:

1. A method of forming multichromal balls, comprising the steps of
    providing a plurality of streams of differently colored hardenable liquids flowing in substantially the same direction,
    directing the lead ends of the streams towards each other,
    forming a single side-by-side multichromal stream as said plurality of streams merge together,
    moving said single side-by-side multichromal stream through a fluid medium as one or more free jets, so that their forward ends become unstable and break up into droplets which form into spherical balls, each of said balls comprising layers of differently colored hardenable liquid, and
    hardening said balls.

2. The method of forming multichromal balls as defined in claim 1 wherein said step of forming a single side-by-side multichromal stream produces a rod-like stream.

3. The method of forming multichromal balls as defined in claim 1 wherein said step of forming a single side-by-side multichromal stream produces a sheet-like stream.

4. The method of forming multichromal balls as defined in claim 3 wherein said step of forming said sheet-like stream produces a cylindrical stream.

5. The method of forming multichromal balls as defined in claim 1 wherein said single side-by-side multichromal stream is expelled into a gaseous fluid.

6. The method of forming multichromal balls as defined in claim 5 wherein said fluid medium is air.

7. The method of forming multichromal balls as defined in claim 1 wherein said single side-by-side multichromal stream is expelled into a liquid.

* * * * *